(12) United States Patent
Petculescu et al.

(10) Patent No.: US 11,036,717 B2
(45) Date of Patent: *Jun. 15, 2021

(54) TRIE-STRUCTURE FORMULATION AND NAVIGATION FOR JOINING

(71) Applicant: MICROSOFT TECHNOLOGY LICENSING, LLC, Redmond, WA (US)

(72) Inventors: Cristian Petculescu, Seattle, WA (US); Marius Dumitru, Sammamish, WA (US); Vasile Paraschiv, Redmond, WA (US); Amir Netz, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 406 days.

This patent is subject to a terminal disclaimer.

(21) Appl. No.: 15/972,555

(22) Filed: May 7, 2018

(65) Prior Publication Data

US 2018/0253466 A1 Sep. 6, 2018

Related U.S. Application Data

(63) Continuation of application No. 14/610,963, filed on Jan. 30, 2015, now Pat. No. 9,977,812.

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
CPC .............................. G06F 16/2365; G06F 16/22
(Continued)

(56) References Cited

U.S. PATENT DOCUMENTS 5,615,367 A * 3/1997 Bennett ................. G06F 16/252
6,339,777 B1 * 1/2002 Attaluri ................. G06F 16/284
(Continued)

FOREIGN PATENT DOCUMENTS

CN 102567457 A 7/2012

OTHER PUBLICATIONS

"Office Action and Search Report Issued in Chinese Patent Application No. 201580034946.2", dated Feb. 27, 2019, 23 Pages.
(Continued)

*Primary Examiner* — Joshua Bullock
(74) *Attorney, Agent, or Firm* — Workman Nydegger

(57) ABSTRACT

A computer-navigable trie structure used in order to represent predicates for matching foreign keys to primary rows in a primary table. The predicates may be wide ranging, and each may be represented by a corresponding descendant path of the trie structure, and defines which foreign keys are to be mapped to the particular row. The trie structure is built by incrementally augmenting the trie structure as each predicate is analyzed. During later use of the trie structure, each foreign key that is a candidate for mapping to one or more parent rows are evaluated. The foreign key is used to navigate through a set of one or more descendant paths of the computer-navigable trie structure. Matching parent rows may then be identified based on the identity of the navigated descendant paths. The foreign key may then be mapped to each of the one or more matching parent rows.

20 Claims, 9 Drawing Sheets

(58) Field of Classification Search
USPC .......................................................... 707/797
See application file for complete search history.

(56) References Cited

U.S. PATENT DOCUMENTS

| | | | |
|---|---|---|---|
| 8,407,180 B1* | 3/2013 | Ramesh | G06F 16/24544 |
| | | | 707/609 |
| 2002/0194149 A1* | 12/2002 | Gerber | G06F 16/284 |
| 2009/0125530 A1* | 5/2009 | Martinsson | G06F 16/2228 |
| 2009/0144295 A1* | 6/2009 | Mion | G06F 16/00 |
| 2009/0198729 A1* | 8/2009 | Gong | G06F 16/217 |
| 2012/0117067 A1* | 5/2012 | Yakubovich | G06F 16/2246 |
| | | | 707/737 |
| 2014/0172905 A1* | 6/2014 | Konik | G06F 16/951 |
| | | | 707/769 |
| 2015/0261862 A1* | 9/2015 | Mittal | G06F 16/951 |
| | | | 707/722 |
| 2016/0062997 A1* | 3/2016 | Roussey | G06F 16/24552 |
| | | | 707/736 |

OTHER PUBLICATIONS

"Non Final Office Action Issued in U.S. Appl. No. 15/896,386", dated Nov. 20, 2019, 9 Pages.
"Second Office Action Issued in China Patent Application No. 201580034946.2", dated Aug. 1, 2019, 7 Pages.

* cited by examiner

TRIE-STRUCTURE FORMULATION AND NAVIGATION FOR JOINING

CROSS-REFERENCE TO RELATED APPLICATIONS

This application is a continuation of U.S. patent application Ser. No. 14/610,963 filed on Jan. 30, 2015, entitled "TRIE-STRUCTURE FORMULATION AND NAVIGATION FOR JOINING," which issued as U.S. Pat. No. 9,977,812 on May 22, 2018, and which application is expressly incorporated herein by reference in its entirety.

BACKGROUND

Computing systems and associated networks have revolutionized the way human beings work, play, and communicate. Nearly every aspect of our lives is affected in some way by computing systems. Computing systems are now largely connected to networks and the Internet so as to enable widespread communications. Database technologies are enabled through the use of computing systems. In relational database systems, there are multiple interrelated tables, where the relationships are defined by links between tables.

Often tables are linked such that a field in one table (called the "referencing table" or the "child table") uniquely identifies a row (e.g., a primary key) of another table (called the "referenced table" or the "parent table"). Thus, the foreign key is used to establish and enforce a link between the child and parent tables.

Conventionally, the foreign key of the child table uniquely identifies the row of the parent table through direct equality in which the foreign key is exactly the same as the parent key. In the case of the foreign and primary keys both being text, the foreign key of the child table might also uniquely identify the row of the parent table by containing the text of the primary key of that row. Accordingly, the foreign key of the child table uniquely identifies a row of the parent table by being the same as (or containing in the case of text) the primary key of that row.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In at least some embodiments described herein, a computer-navigable trie structure is used in order to represent predicates for matching, and thereby linking foreign keys to primary rows in a primary table. The predicates may be wide ranging, and each may be represented by a corresponding descendant path of the trie structure. Each predicate is associated with a particular row in a parent table and at least in part (e.g., with one or more other predicates that might also correspond to the particular row) defines which foreign keys are to be mapped to the particular row.

The trie structure is built by incrementally augmenting the trie structure as each predicate is analyzed. For instance, for each row, one or more predicates are analyzed. For instance, these one or more predicates may define which foreign keys, if any, are to be mapped to the corresponding parent row. The trie structure is then augmented to insure that the predicate (along with any predicate arguments) are included within a descendant path of the trie structure. The parent row is then associated with the descendant path.

During later use of the trie structure, each relevant foreign key is evaluated. The foreign key is used to navigate through a set of one or more descendant paths of the computer-navigable trie structure. A set of one or more matching parent rows may then be identified based on the identity of the descendant paths of the set of one or more descendant paths. The foreign key may then be mapped to each of the one or more matching parent rows. Accordingly, mapping of sets of foreign keys of a child table to parent rows of the parent table may be performed by traversal of a computer-navigable trie structure, resulting in rapid formulation of mappings, with fewer use of processing resources.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
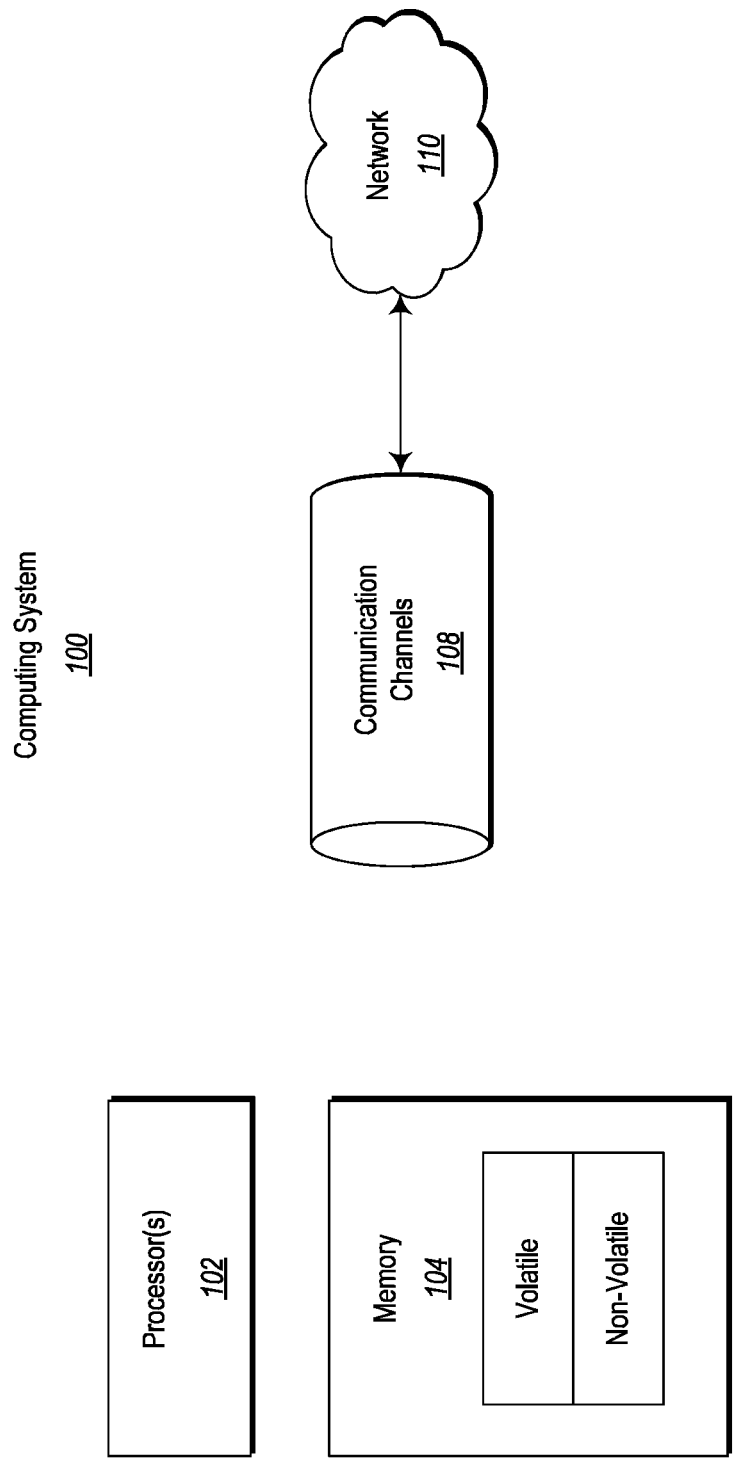
FIG. 1 abstractly illustrates a computing system in which some embodiments described herein may be employed.

At least some embodiments described herein relate to the linking of a child table to a parent table in a database system using a foreign key in the child table. For a given row of a parent table, an expression associated with the particular row is identified. In one embodiment, the expression is a semantic expression that comprises something different than or more than just an equals expression or a contains expression. For instance, the expression might be a compound expression, a ranged expression, a set expression, and so forth, representing a more complex relationship. The expression might also take as input a field of the parent table other than the primary key of the parent table.

For each of multiple (and potentially all) rows of a child table, the expression is evaluated against a foreign key of the corresponding row of the child table. If the foreign key of the corresponding row of the child table matches the expression based on the act of evaluating, an association is created between the foreign key and the particular row of the parent table, and that association may perhaps be persisted, for instance, for later use in response to a query.

The expression might be applicable to all rows of the parent table to thereby similarly create associations between foreign keys of the child table and the corresponding matching rows of the parent table. However, in some embodiments, the expressions may differ even down to the granularity of a single row in the parent table, thereby enabling perhaps custom per-row expressions that define one or more association criteria. In that case, perhaps there is a dedicated column in the parent table for such expressions.

In some embodiments described herein, a computer-navigable trie structure is used in order to represent predicates for matching foreign keys to primary rows in a primary table. The predicates may be wide ranging, and each may be represented by a corresponding descendant path of the trie structure. Each predicate is associated with a particular row in a parent table and at least in part (e.g., with one or more other predicates that might also correspond to the particular row) defines which foreign keys are to be mapped to the particular row. Accordingly, the collection of one or more predicate clauses is the semantic expression used for mapping foreign keys to rows in the parent table.

The trie structure is built by incrementally augmenting the trie structure as each predicate is analyzed. For instance, for each row in the parent table, one or more predicates are analyzed. For instance, these one or more predicates may define which foreign keys, if any, are to be mapped to the corresponding parent row. The trie structure is then augmented to insure that it (along with any predicate arguments) are included within a descendant path of the trie structure. The parent row is then associated with the descendant path.

During later use of the trie structure, each relevant foreign key is evaluated. The foreign key is used to navigate through a set of one or more descendant paths of the computer-navigable trie structure. A set of one or more matching parent rows may then be identified based on the identity of the descendant paths of the set of one or more descendant paths. The foreign key may then be mapped to each of the one or more matching parent rows. Accordingly, mapping of sets of foreign keys of a child table to parent rows of the parent table may be performed by traversal of a computer-navigable trie structure, resulting in rapid formulation of mappings, with fewer use of processing resources.

Some introductory discussion of a computing system will be described with respect to FIG. 1. Then, embodiments of such expression based associating using a computer-navigable trie structure will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
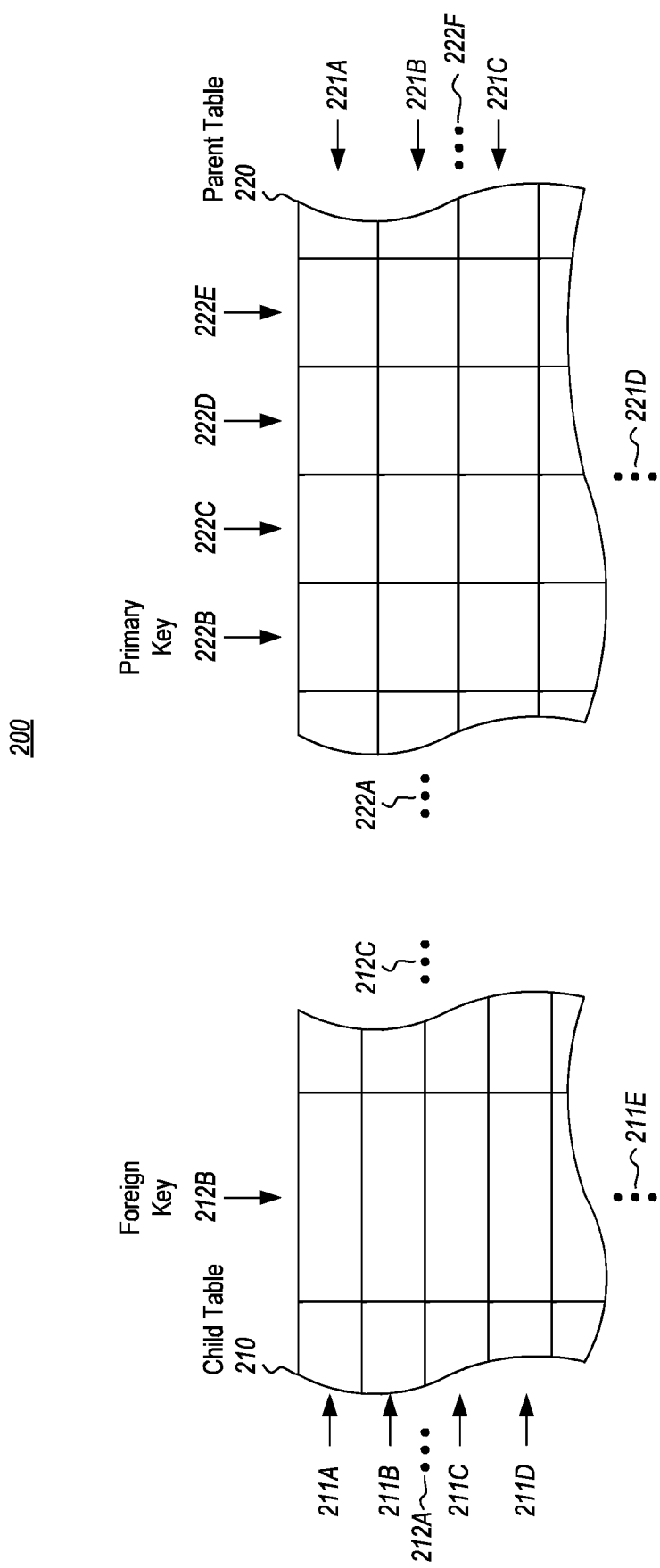
FIG. 2 illustrates a database system in which the principles described herein may operate, and which includes a child table and a parent table.

FIG. 2 illustrates a database system 200 in which the principles described herein may operate. The database environment 200 includes a child table 210 and a parent table 220. The principles described herein may operate upon any configuration of child table and any configuration of parent table regardless of the number of rows and columns in each, or the values.

For example purposes only, the child table 210 is illustrated as including four rows 211A, 211B, 211C and 211D. However, the ellipses 211E represent that the child table 210 may include any number of rows, even fewer than the four illustrated. For instance, the child table 210 may include as little as a single row, and as many as an enumerable number of rows, and anything in-between. Similarly, the child table 210 is illustrated as including a single column 212B, although the ellipses 212A and 212C represent that the child table 210 may include any number of columns. The column 212B is a foreign key column that includes values (not illustrated concretely) that may be used to uniquely identify a corresponding row in the parent table 220.

For example purposes only, the parent table 220 is illustrated as including three rows 221A, 221B and 221C. However, the ellipses 221D represent that the parent table 220 may include any number of rows, even fewer than the three illustrated. For instance, the parent table 220 may include as little as a single row, and as many as an enumerable number of rows, and anything in-between. Similarly, the parent table 220 is illustrated as including four columns 222B, 222C, 222D and 222E, although the ellipses 222A and 222F represent that the parent table 220 may include any number of columns. The column 222B is a primary key column that includes values (not illustrated concretely in FIG. 2) that may be used to uniquely identify a corresponding row in the parent table 220. Although FIG. 2 is illustrated in abstract form, with no values illustrated, more concrete examples will be described below with respect to FIGS. 4 and 5.

In this description and in the claims, the terms "row" and "column" are used. The term "row" is not restricted to an element that is stacked vertically, and extended horizontally. Furthermore, the term "column" is not restricted to an element that is stacked horizontally, and extended vertically. The manner in which a table is displayed is not important to the principles of the present invention as described herein. The tables described herein are not necessarily tables that are illustrated in a user interface, by a computer-readable form. Accordingly, the terms horizontal and vertical have little meaning in such computer-readable tables. Thus, the terms "rows" and "columns" described herein are merely referring to two district dimensions of a computer representation of the table.

Figure 3:
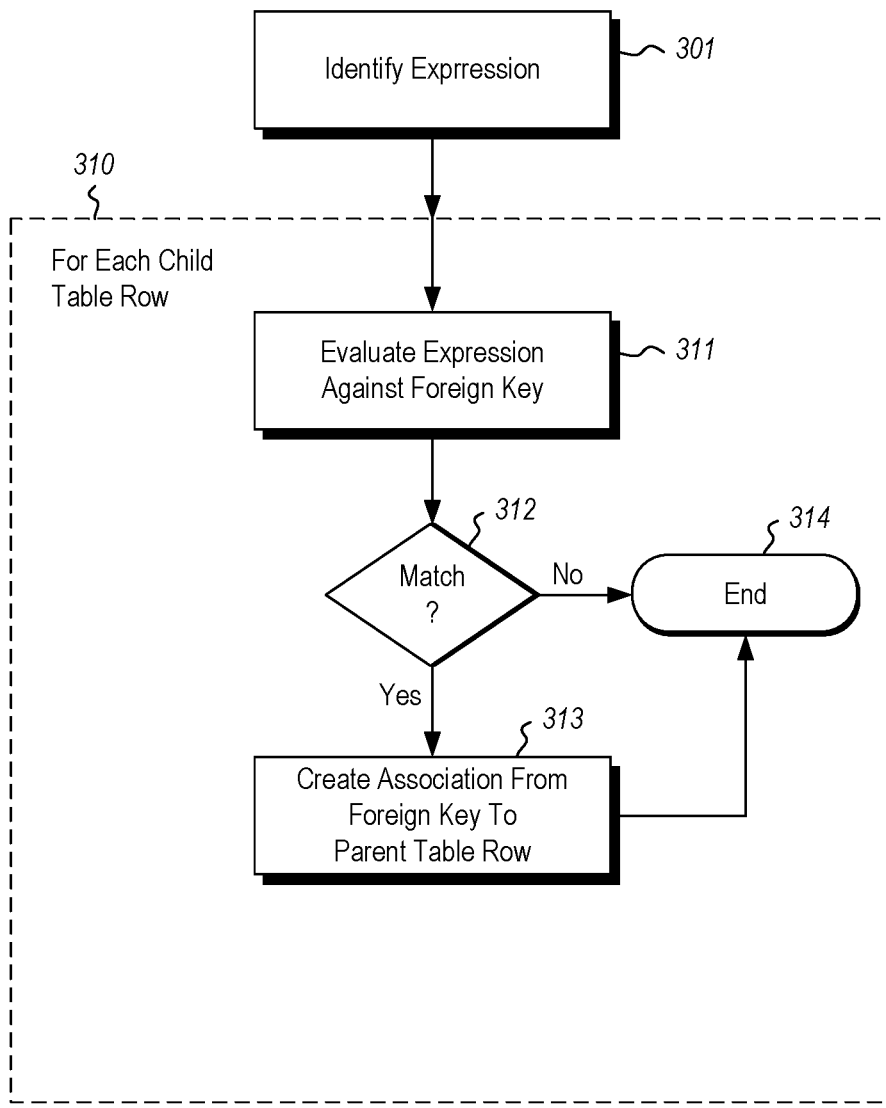
FIG. 3 illustrates a flowchart of a method for linking a child table to a parent table in a database system using a foreign key field in the child table.

In accordance with the principles described herein, associations are made between at each of least some of the foreign keys in the foreign key column 212B of the child table 210 and corresponding sets of one or more rows in parent table 220. In such a manner, the principles described herein link the child table 210 to a parent table 220. Accordingly, FIG. 3 illustrates a flowchart of a method 300 for linking a child table to a parent table in a database system using a foreign key field in the child table. As the method 300 may be performed within the database system 200 of FIG. 2, the method 300 will now be described with frequent reference to FIG. 2. The method 300 may be performed by, for instance, a computing system (such as computing system 100) by one or more processors of the computing system (e.g., processors 102) executing one or more computer-executable instructions.

The method 300 may be repeated for each row in the parent table. In fact, as described further below, the method 300 may be performed substantially concurrently for all rows in the parent table. Such might be accomplished using a trie structured. For each row in the parent table, the method 300 involves identifying an expression (act 301). The expression is used for each row in the child table to determine whether the child table row is to be associated with the row that corresponds to the expression in the parent table. To make the determination for each child table row with respect to a given parent table row, the expression takes as input the foreign key of the child table row one or more fields of the parent table row.

For instance, in the context of FIG. 2, the expression associated with the parent table row 221A is identified, and the foreign key of the child table row 211A and one or more values of the parent table row 221A would be provided as input to the expression to evaluation whether there is a match. Similarly, the foreign key of the child table row 211B and one or more values of the parent table row 221A would be provided as input to the expression to evaluate whether there is a match. Also, the foreign key of the child table row 211C and one or more values of the parent table row 221A would be provided as input to the expression to evaluate whether there is a match. Finally, at least with respect to the parent table row 221A and the illustrated child table rows 211A through 211D, the foreign key of the child table row 211D and one or more values of the parent table row 221A would be provided as input to the expression to evaluate whether there is a match.

Similarly, each of the child table rows 211A through 211D would be evaluated against the expression for the parent table row 211B perhaps at the same time as the child table rows 211A through 211D would be evaluated against the expression for parent table row 211A. Also, each of the child table rows 211A through 211D would be evaluated against the expression for the parent table row 211C perhaps at the same time as the child table rows 221A through 211D would be evaluated against the expressions for parent table rows 221A and 221B.

Conventionally, expressions defining an association between a foreign key and a parent table row are simply based on an equality to the primary key, and is the same for all rows in the parent table. For instance, if the foreign key for a given child table row is the same as the primary key for any of the parent table rows, then an association would be made between the foreign key of the child table row and the matching parent table row. In the case of text, the expression may be a "contains" expression. That is, if the foreign key (in the form of text) for a given child table row contains the text of the primary key for any of the parent table row, then an association would be made between the foreign key of the child table row and the matching parent table row.

In contrast, in accordance with the principles described herein, an expression may be any expression, including semantic expressions, and can use values from the parent table row other than the primary key. Furthermore, while not required, the expression may differ by parent table row. Accordingly, row based expressions of association criteria are enabled herein. In this description and in the claims, a "semantic expression" is an expression that semantically describes one or more association criteria, and an equals or contains criteria expressly falls outside of the definition of "semantic expression".

Figure 4:
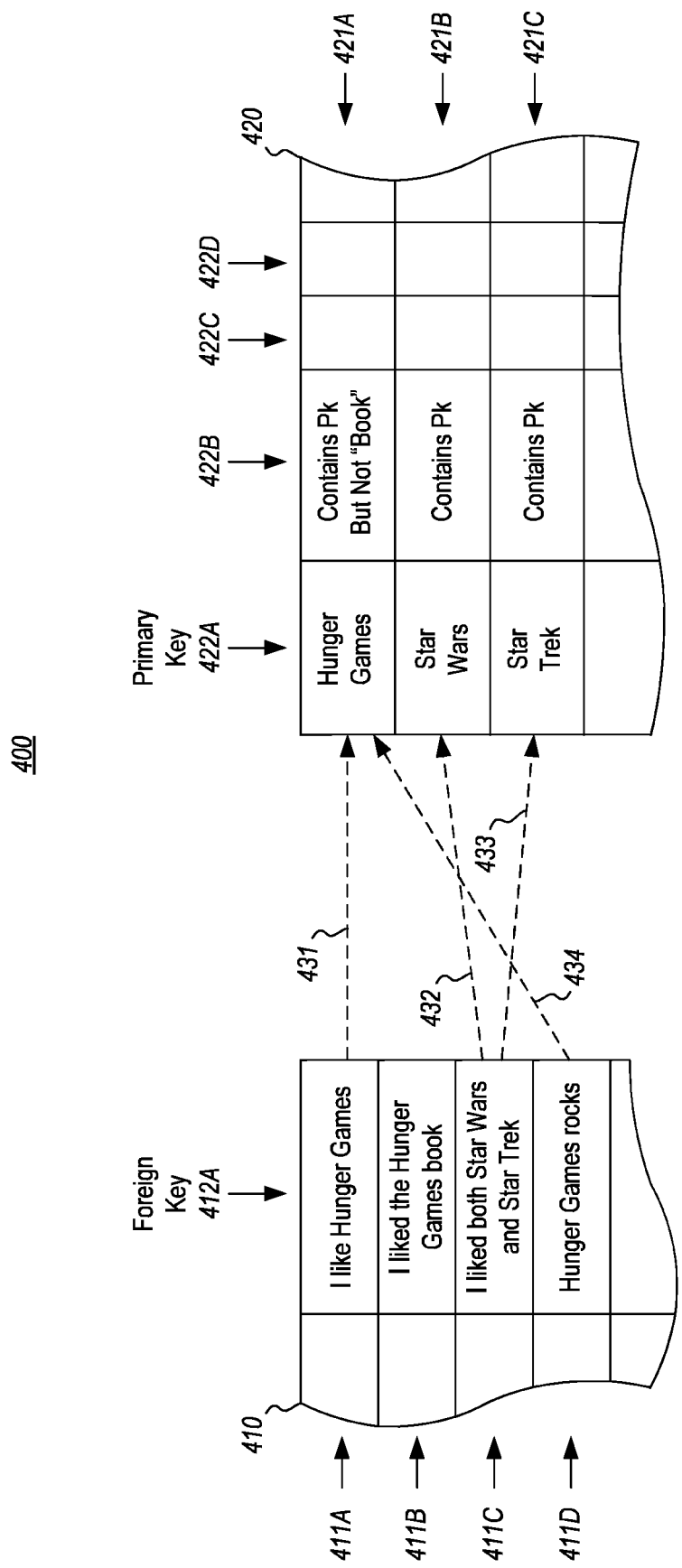
FIG. 4 illustrates an example database system in which there is a tweet child table and a movies parent table.

For instance, as an example, a semantic expression includes a component expression, a ranged expression, a set expression, or the like. For instance, FIG. 4 illustrates an example database system 400 in which there is a tweet child table 410 and a movies parent table 420. The tweet child table 410 includes a foreign key column 412A that lists various tweets made. The movie parent table 420 includes a primary key column 422A that lists various movies. In this case, the expression for each parent table row is identified included within (and identified by referencing) the expressions column 422B. The expression for parent table row 421A (i.e., contains [Primary Key] but not "Book") is a compound semantic expression, and is different than the expressions of the remaining parent table rows 421B and 421C (which is contains [Primary Key]).

The method 300 of FIG. 3 will now be described with respect to the example database system 400 of FIG. 4. The content of dashed-lined box 310 may be performed for each child table row. Accordingly, the contents of dashed-lined box 310 are performed for the tweet "I like Hunger Games" in child table row 411A. The tweet "I like Hunger Games" is then evaluated against the expression "Contains 'Hunger Games', but not 'book'". It is match ("Yes" in decision block 312), and thus an association 431 is made (act 313) between the foreign key "I like Hunger Games" and the parent table row 421A that contains the movie primary key "Hunger Games". This is because the tweet "I like Hunger Games" contains the term "Hunger Games" (the primary key), but does not contain the term "Book", and is thus a match to the expression in the expression field 422B of the corresponding parent table row 421A.

The contents of dashed-lined box 310 are also performed for the tweet "I liked the Hunger Games book" in child table row 411B. The tweet "I liked the Hunger Games book" is then evaluated against the expression "Contains 'Hunger Games', but not 'book'". It is not a match ("No" in decision block 312) because the tweet contains the term "book". Accordingly, no further evaluation (act 314) of the child table row 411B need be performed with respect to the parent table row 421A.

The contents of dashed-lined box 310 are also performed for the tweet "I liked both Star Wars and Star Trek" in child table row 411C, which is evaluated against the expression "Contains 'Hunger Games', but not 'Book'". It is not a match ("No" in decision block 312). Accordingly, no further evaluation (act 314) of the child table row 411C need be performed with respect to the parent table row 421A.

The contents of dashed-lined box 310 are also performed for the tweet "Hunger Games rocks" in child table row 411D, which is evaluated against the expression "Contains 'Hunger Games', but not 'Book'". It is a match ("Yes" in decision block 312), and thus an association 434 is made (act 313) between the foreign key "Hunger Games rocks" and the parent table row 421A. This is because the tweet "I like Hunger Games" contains the term "Hunger Games" (the primary key), but does not contain the term "Book", and is thus a match to the expression in the expression field 422B of the corresponding primary row field 421A.

The method 300 is also performed with respect to the parent table row 421B is a similar manner. The contents of dashed-lined box 310 are thus performed for the tweet "I like Hunger Games" in child table row 411A. The tweet "I like Hunger Games" is evaluated against the expression "Contains 'Star Wars'" (act 311). It is not a match ("No" in decision block 312).

The tweet "I liked the Hunger Games book" is then evaluated against the expression "Contains 'Star Wars'" (act 311). It is also not a match ("No" in decision block 312), and thus no association is made.

The tweet "I like both Star Wars and Star Trek" is then evaluated against the expression "Contains 'Star Wars'" (act 311). It is a match ("Yes" in decision block 312). Accordingly, association 432 is made (act 313) between the tweet "I liked both Star Wars and Star Trek" and the parent table row 421B that has the movie primary key "Star Wars".

The tweet "Hunger Games rocks" is then evaluated against the expression "Contains 'Star Wars'" (act 311). It is not a match ("No" in decision block 312), and thus no association is made.

The method 300 is also performed with respect to the parent table row 421C is a similar manner. The contents of dashed-lined box 310 are thus performed for the tweet "I like Hunger Games" in child table row 411A. The tweet "I like Hunger Games" is evaluated against the expression "Contains 'Star Trek;" (act 311). It is not a match ("No" in decision block 312).

The tweet "I liked the Hunger Games book" is then evaluated against the expression "Contains 'Star Trek'" (act 311). It is also not a match ("No" in decision block 312), and thus no association is made.

The tweet "I like both Star Wars and Star Trek" is then evaluated against the expression "Contains 'Star Trek'" (act 311). It is a match ("Yes" in decision block 312). Accordingly, association 433 is made (act 313) between the tweet "I liked both Star Wars and Star Trek" and the parent table row 421B that has the movie primary key "Star Wars".

Figure 5:
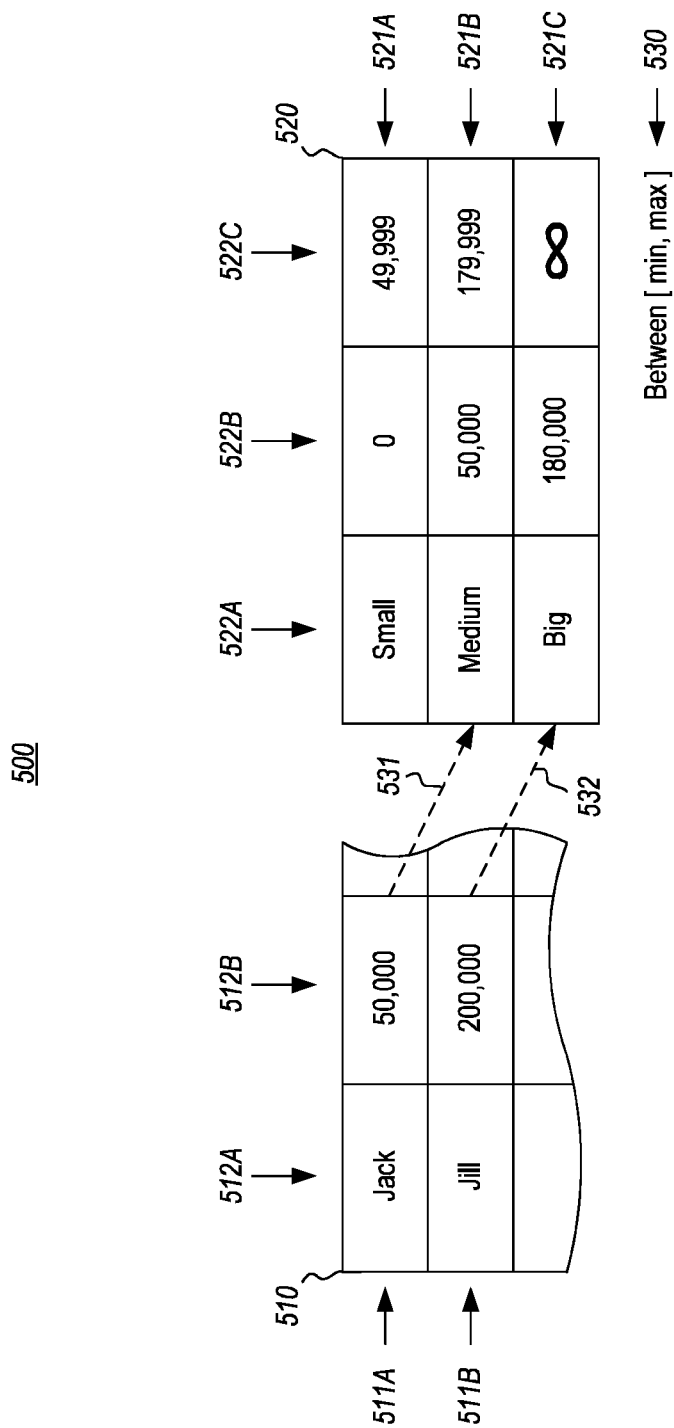
FIG. 5 illustrates an example database system in which there is an employee child table and a salary range parent table.

A second example is illustrated in FIG. 5, which illustrates an example database system 500 in which there is an employee child table 510 and a salary range parent table 520. In the child table 510, there is a name column 512A and a salary column 512B. The salary column 512 serves as the primary key column. In this case, the expression 530 for each parent table row is the same, but is a complex expression, and uses fields other than the primary key field as an input to the expression. In particular, the expression 530 indicates that if the foreign key is between the value in the minimum column 522B and the maximum column 522C for the respective parent table row, then the foreign key will be associated with the corresponding parent table row.

The method 300 of FIG. 3 will now be described with respect to the example database system 500 of FIG. 5. The method 300 is performed with respect to the parent table row 521A having the primary key Small. The content of dashed-lined box 310 may be performed for each of child table row 511A and 511B. In each case, however, the salary is not within 0 and 49,000 ("No" in decision block 312), and thus there are no associations made in this performance of method 300.

The method 300 is also performed with respect to the parent table row 521B having the primary key Medium. Here the foreign key 50,000 for child table row 511A matches (it is between 50,000 and 179,999, inclusive) ("Yes" in decision block 312), and thus association 531 is made between the foreign key 50,000 of child table row 511A and the parent table row 521B. As for child table row 511B, the value 200,000 is not between 50,000 and 179,999 ("No" in decision block 312), and thus no association is made (act 314).

The method 300 is also performed with respect to the parent table row 521C having the primary key High. Here the foreign key 50,000 for child table row 511A is not 180,000 or greater ("No" in decision block 312), and thus no association is made (act 314). However, the foreign key 200,000 for child table row 511B is greater than 180,000 ("Yes" in decision block 312), and thus association 532 is made between the foreign key 200,000 of child table row 511B and the parent table row 521C. In this case, the expression was a ranged expression. A set expression is a case in which the foreign key is evaluated to determine if it is one of a number of values.

As previously mentioned, the method 300 may be concurrently performed for each parent table row through the use of a trie structure, even if the expressions may differ from one parent table row to the next. The primary key of the parent table is used to construct a trie structure.

Figure 6:
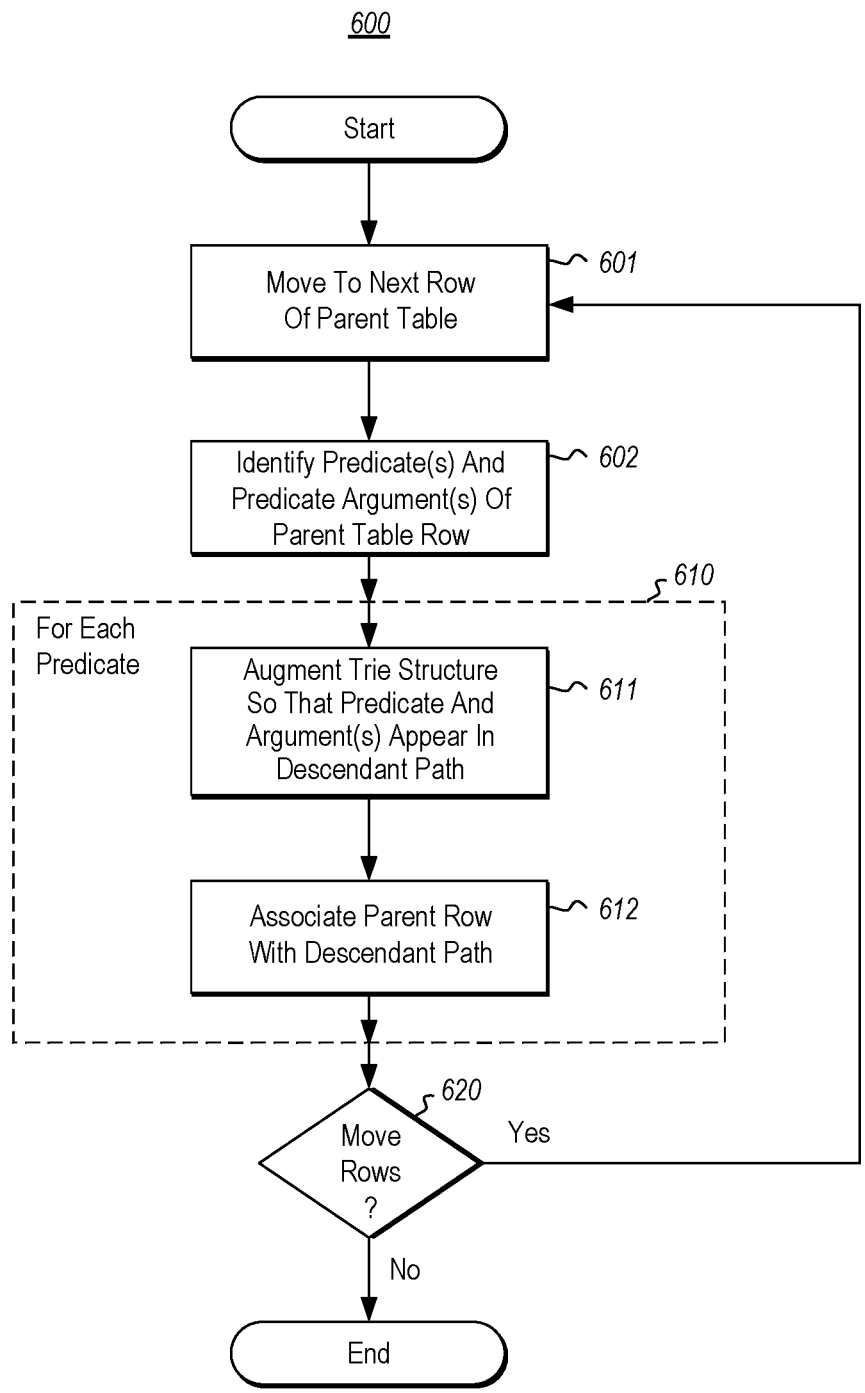
FIG. 6 illustrates a flowchart of the method for constructing a computer-navigable trie structure.

FIG. 6 illustrates a flowchart of the method 600 for constructing a computer-navigable trie structure. The method 600 involves creating the trie structure by incrementally augmenting the trie structure in response to evaluating the rows in the parent table. For instance, FIG. 7A through 7D illustrates successive states 700A through 700D of a computer-navigable trie structure (referred to generally as "trie structure 700") that results from the application of method 600 to the parent table 420 of FIG. 4. Accordingly, the method 600 of FIG. 6 will be described as applied to the parent rows 421A, 421B and 421C of the parent table 420 in sequence, to thereby result in the successful states 700A, 700B, 700C and 700D of FIGS. 7A through 7D, respectively.

Accordingly, the method 600 further includes an act of proceeding to the next row in the parent table (act 601). In the case of the method 600 just initiating, this would be the first row in the table. Of course, the use of the terms "first" or "next" does not necessitate any order in the evaluation of the rows of the parent table. In fact, the construction of the trie structure is generally commutative such that the same trie structure may result regardless of the order in which the rows are evaluated. The principles described herein of course do not depend on all rows in the parent table being evaluated. Furthermore, the evaluation of a row will now necessarily result in augmentation of the trie structure. Nevertheless, for at least some of the rows in the parent table, evaluation of the row will lead to augmentation of the trie structure.

The method 600 then includes evaluating the row in the parent table to identify one or more predicates of the parent row (act 602) as well as one or more associated predicate arguments. The predicate is associated with a particular row in a parent table and that at least in part defines which foreign keys are to be mapped to the particular row using one or more predicates. For instance, in the row 421A, there are two predicates. First there is a "contains" predicate, with the argument being "Hunger Games", which is the primary key of the parent row 421A. Second, there is a "does not contain" predicate, with the argument being "Book". The content of dashed-line box 610 is then performed for each predicate for that particular row. Thus, for row 421A, since there are two predicates, the content of dashed-line box 610 will be performed twice.

Figure 7A:
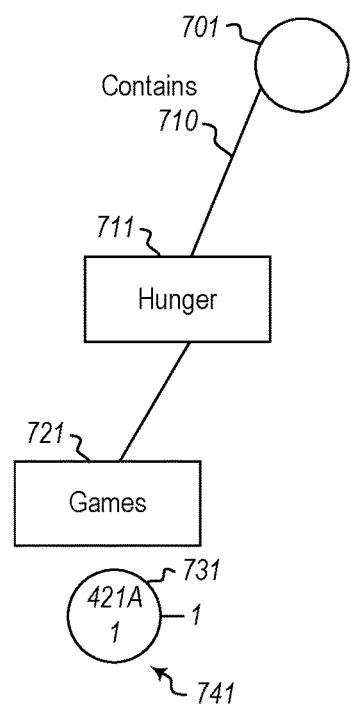
FIG. 7A through 7C illustrates several intermediate states of an example trie structure encountered during construction in accordance with FIG. 6 when constructing a trie structure that represents the parent table in FIG. 4.

The trie structure is then augmented (act 611) so that the predicate and any associated predicate arguments are included within a descendant path of the trie structure. For instance, the row 421A first includes a "contains" predicate, with the argument being "Hunger Games". FIG. 7A illustrates the augmented state 700A of the trie structure 700, which includes a descendant line 741 leading from the root node 701, through a "contains" predicate association 710, to the child node 711 that contains the argument "Hunger", and then to the grandchild node 721 that contains the argument "Games". Accordingly, navigating from the root node 701 to the grandchild node 721 in the descendant path 741, the "contains 'Hunger Games'" predicate clause is fully represented.

The parent row is then associated with the descendant path (act 612). For instance, in FIG. 7A, the descendant path 741 is terminated with a leaf node 731 that includes an identifier for the parent row 421A. Accordingly, trie structure 700 in the state 700A may be navigated using a foreign key to at least partially determine if the foreign key should be mapped to the row 421A.

Figure 7B:
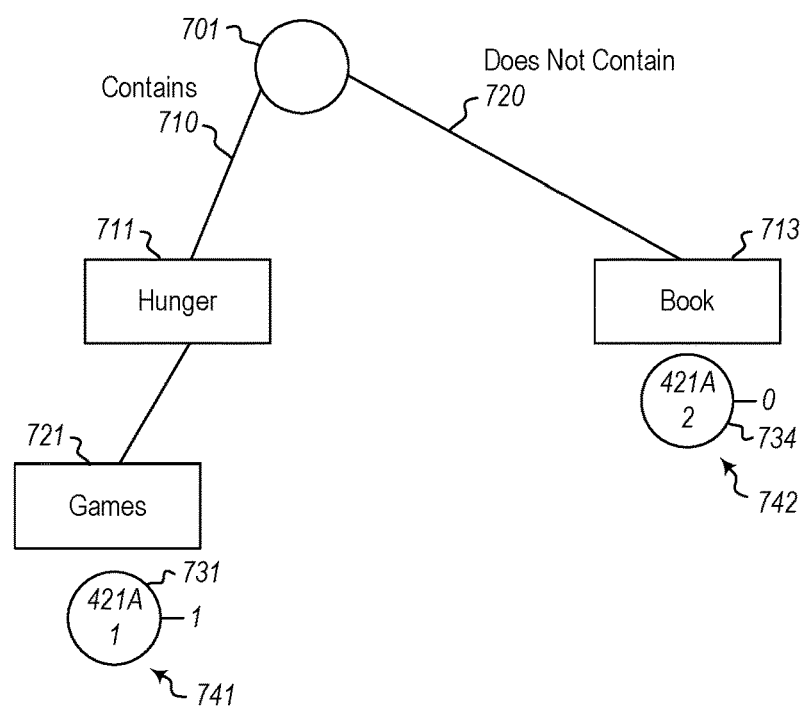

But of course, the parent row had two predicates. The second predicate is a "does not contain" predicate having a predicate argument "Book". Accordingly, the trie structure is then augmented (act 611) so that the predicate and any associated predicate arguments are included within a descendant path of the trie structure. FIG. 7B illustrates the augmented state 700B of the trie structure 700, which includes the descendant path 742 leading from the root node 701, through a "does not contain" predicate association 720, to the child node 713 that contains the argument "Book".

Accordingly, navigating from the root node 701 to the child node 713 in the descendant path 742, the "does not contain 'Hunger Games'" predicate clause is fully represented.

The parent row is then associated with the descendant path (act 612). For instance, in FIG. 7B, the descendant path 742 is terminated with a leaf node 734 that includes an identifier for the parent row 421A. Accordingly, trie structure 700 in the state 700A may be navigated using a foreign key to determine if the foreign key should be mapped to the row 421A.

Rather than the association 720 being a "does not contain" association, there might rather just be a single "contains" association, with the leaf node somehow representing whether the negative predicate is a requirement (i.e., the predicate is a nullifying predicate). For instance, in the descendant path 741, the leaf node 731 is labelled as having a binary "1" leading from its right side. This might be used to determine that the row 421A requires the predicate to be met (and thus the row requires that the foreign key contain the term "Hunger Games"). On the other hand, in the descendant path 742, the leaf node 734 is labelled as having a binary "0" leading from its right side. This might be used to determine that the row 421A requires that the predicate clause "contains book" not be met (which means of course that the predicate clause "does not contain book" is met). Thus, by including a bit within the leaf node, the number of possible predicate types doubles.

Note also that where there are multiple predicate clauses that are to be satisfied in order for a foreign key to map to a particular parent row, there may be an indication of such within the leaf node. For instance, there might be an indication within leaf node 731 that the predicate clause of the descendant path 741 is only one of two predicate clauses to be satisfied if the mapping of the foreign key to the parent row 421A is to occur. Furthermore, there is an indication within leave node 734 that the predicate clause of the descendant path 742 is only one of two predicate clauses to be satisfied if the mapping of the foreign key to the parent row 421A is to occur.

Having completed incremental augmentation of the trie structure with respect to the parent row 421A, processing exits the dashed-line box 610, and it is then determined whether there are more rows to be evaluated (decision block 620). In the example, of FIG. 4, there are yet two more rows to be evaluated ("Yes" in decision block 620). Accordingly, processing proceeds to the next row in the parent table (act 601). In the case of FIG. 4, this next row would be row 421B.

The method 600 then includes evaluating the row in the parent table to identify one or more predicates of the parent row (act 602) as well as one or more associated predicate arguments. For instance, in the row 421B, there is but a single predicate clause—which is that the foreign key contains the term "Star Wars", which is the primary key of the row 421B. The content of dashed-line box 610 is then performed for this single predicate clause for this row.

Figure 7C:
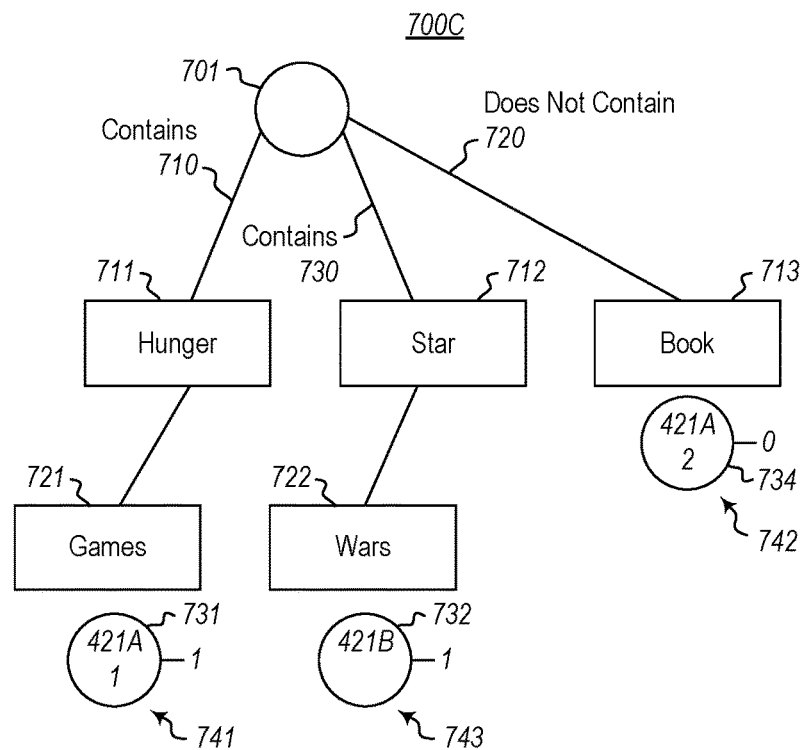

The trie structure is then augmented (act 611) so that the predicate and any associated predicate arguments are included within a descendant path of the trie structure. FIG. 7C illustrates the augmented state 700C of the trie structure 700, which includes the descendant path 743 leading from the root node 701, through a "contains" predicate association 730, to the child node 712 that contains the argument "Star", and then to the grandchild node 721 that contains the argument "Wars". This descendant path will be referred to as descendant path 743. Accordingly, navigating from the root node 701 to the grandchild node 722 in the descendant path 743, the "contains 'Star Wars'" predicate clause is fully represented.

The parent row is then associated with the descendant path (act 612). For instance, in FIG. 7C, the descendant path 743 is terminated with a leaf node 732 that includes an identifier for the parent row 421B. Accordingly, trie structure 700 in the state 700C may be navigated using a foreign key to determine if the foreign key should be mapped to the either of the parent table rows 421A and 421B.

Having completed incremental augmentation of the trie structure with respect to the parent row 421B, processing exits the dashed-line box 610, and it is then determined whether there are more rows to be evaluated (decision block 620). In the example, of FIG. 4, there is a final row to be evaluated ("Yes" in decision block 620). Accordingly, processing proceeds to the next row in the parent table (act 601). In the case of FIG. 4, this next row would be row 421C.

The method 600 then includes evaluating the row in the parent table to identify one or more predicates of the parent row (act 602) as well as one or more associated predicate arguments. For instance, in the row 421C, there is but a single predicate clause—which is that the foreign key contains the term "Star Trek", which is the primary key of the row 421C. The content of dashed-line box 610 is then performed for this single predicate for this row.

Figure 7D:
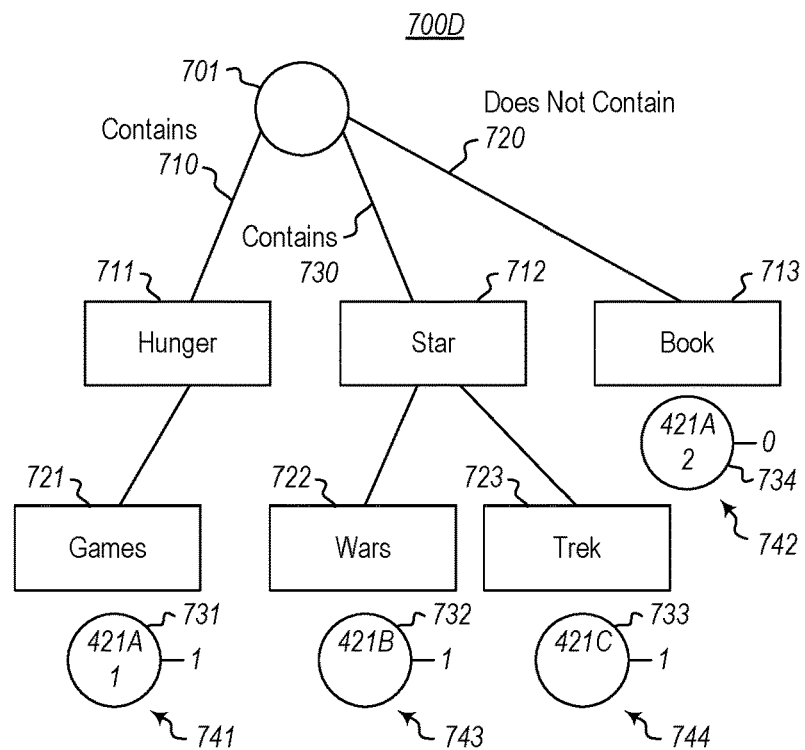
FIG. 7D illustrates a final state of the example trie structure that represents the parent table in FIG. 4.

The trie structure is augmented (act 611) so that the predicate and any associated predicate arguments are included within a descendant path of the trie structure. FIG. 7D illustrates the augmented and final state 700D of the trie structure 700, which includes the descendant path 744 leading from the root node 701, through the "contains" predicate association 730, again to the same child node 712 that contains the argument "Star", and then to the grandchild node 723 that contains the argument "Trek". Accordingly, navigating from the root node 701 to the grandchild node 723 in the descendant path 744, the "contains 'Star Trek'" predicate clause is fully represented.

The parent row is then associated with the descendant path (act 612). For instance, in FIG. 7D, the descendant path 744 is terminated with a leaf node 733 that includes an identifier for the parent row 421C. Accordingly, trie structure 700 in the state 700C may be navigated using a foreign key to determine if the foreign key should be mapped to any of the rows 421A through 421C.

Having completed incremental augmentation of the trie structure with respect to the parent row 421C, processing exits the dashed-line box 610, and it is then determined whether there are more rows to be evaluated (decision block 620). In the example, of FIG. 4, there are no more rows to be evaluated ("No" in decision block 620). Accordingly, the trie structure 700 is now constructed with respect to the parent table 420.

Figure 8:
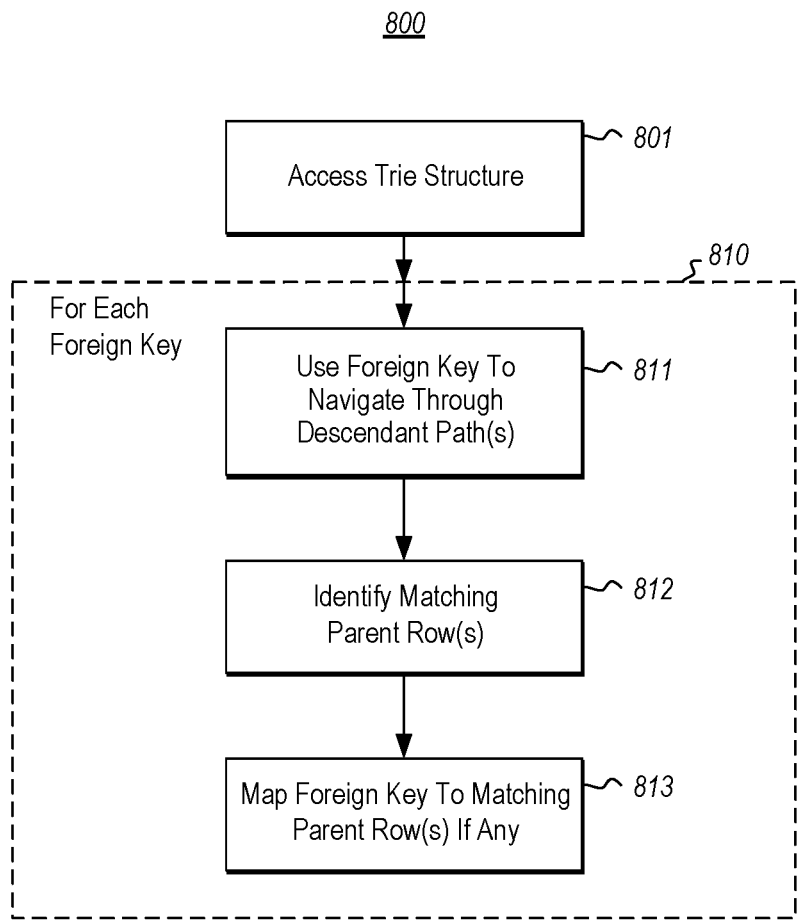
FIG. 8 illustrates a flowchart of a method for navigating a computer-navigable trie structure to thereby formulate links between the foreign keys of child tables and the rows of the parent table.

The trie structure may then be navigated to determine which foreign keys of a child table may be mapped to which rows of the parent table. FIG. 8 illustrates a flowchart of a method 800 for navigating a computer-navigable trie structure. The method 800 may be performed using the trie structure 700D of FIG. 7D to map foreign keys of the child table 410 of FIG. 4 to the parent rows of the parent table 420 of FIG. 4. The method 800 will thus be described with frequent reference to FIGS. 4 and 7D.

The method 800 includes accessing the computer-navigable trie structure (act 801). Then for each of the foreign keys, the content of box 810 is performed. Specifically, the foreign key is used to navigate through one or more descendant paths of the computer-navigable trie structure (act 811).

Then, a set of one or more matching parent rows may be identified (act 812) based on the identity of the navigated descendant paths. The foreign key is then mapped to the matching parent row or rows, if any (act 813). If a particular row contains multiple predicate clauses, then a mapping occurs if the foreign key was used to navigate each of the descendant paths for that parent row. For instance, if both descendant paths 741 and 742 are navigated, and the association 720 truly is a "does not contain" association, then this navigation through the descendant nodes means that both predicates for the parent row 421A are met.

Alternatively, the mapping occurs if a predetermined navigation result is obtained that is consistent with matching of each of the descendant paths corresponding to the plurality of predicates of the particular matching parent row. For instance, if the associations 710 and 720 are both "contains" predicate associations, then the binary 0 on the leaf node 734 means that the predetermine navigation result that would be consistent with a match to the predicate would be that the descendant path 742 is not navigated (which would only happen if the foreign key did not contain the word "Book"). In that case, the fact that the descendant path was not traversed, means that the descendant path 742 was indeed navigated to determine that the predicate has been met.

For instance, navigation of the trie structure 700D based on the tweet foreign key "I like Hunger Games" will now be described. Navigation (act 811) begins at node 701. Navigation to the next level of the hierarchy happens upon encountering the text of the next node. For instance, "I" does not match any text of nodes 711, 712 or 713, and so the navigation remains at the root node 701. "like" is then evaluated, and again there are no matches to the text of nodes 711, 712 or 713. Thus, navigation remains at the root node 701. "Hunger" matches the text for the next node 711, and thus navigation moves to node 711. "Games" matches the text for the next hierarchical node 721, and thus navigation moves to the terminating node 721, which is associated with the first component expression 731 of the compound expression within parent table row 421A. Accordingly, the affirming node for row 721A is encountered. The foreign key has now been evaluated without encountering the nullifying expression 734 for parent table row 421. Accordingly, the association 431 of FIG. 4 can be made (act 813).

Navigation of the trie structure 700D based on the tweet foreign key "I liked the Hunger Games book" will now be described. Navigation begins at node 701. "I" does not match any text of nodes 711, 712 or 713, and so the navigation remains at the root node 701. "liked" is then evaluated, and again there are no matches to the text of nodes 711, 712 or 713. Thus, navigation remains at the root node 701. "the" is then evaluated, and again there are no matches, and navigation remains at root node 701. "Hunger" matches the text for the next node 711, and thus navigation moves to node 711. "Games" matches the text for the next hierarchical node 721, and thus navigation moves to the terminating node 721, which is associated with the first component expression 731 of the compound expression within parent table row 421A. Upon reaching a terminating node, navigation returns to root node 701. "book" matches the text of the next hierarchical node 613. Accordingly, the nullifying node for row 421A is encountered. Accordingly, no association can be made as the reaching of any nullifying node (e.g., node 734) with respect to a compound expression negates any affirming node (e.g., node 731) with respect to the compound expression.

Navigation of the trie structure 700 based on the tweet foreign key "I liked both Star Wars and Star Trek" will now be described. Navigation begins at node 701. "I" does not match any text of nodes 711, 712 or 713, and so the navigation remains at the root node 701. "liked" is then evaluated, and again there are no matches to the text of nodes 711, 712 or 713, and thus navigation remains at the parent node 701. "both" is then evaluated, and again there are no matches, and navigation remains at root node 701. "Star" matches the text for the next node 712, and thus navigation moves to node 712. "Wars" matches the text for the next hierarchical node 722, and thus navigation moves to the terminating node 732, which is an affirming node 732 for the expression in parent table row 421B. There are no nullifying nodes for parent table row 421B. Accordingly, the association 432 of FIG. 4 can be made.

Navigation returns to root node 701. "and" is then evaluated, and again there are no matches to the text of nodes 711, 712 or 713, and thus navigation remains at the root node 701. Star" matches the text for the next node 712, and thus navigation moves to node 712. "Trek" matches the text for the next hierarchical node 723, and thus navigation moves to the terminating node 733, which is an affirming node 733 for the expression in parent table row 421C. There are no nullifying nodes for parent table row 421C. Accordingly, the association 432 of FIG. 4 can be made.

Navigation of the trie structure 700 based on the tweet foreign key "Hunger Games rocks" will now be described. Navigation begins at node 701. "Hunger" matches the text for the next node 711, and thus navigation moves to node 711. "Games" matches the text for the next hierarchical node 721, and thus navigation moves to the terminating node 721, which is associated with the first component expression 731 of the compound expression within parent table row 421A. Accordingly, the affirming node for row 721A is encountered. Navigation returns to root node 701 after reaching a terminating node. "rocks" is then evaluated, and again there are no matches to the text of nodes 711, 712 or 713, and thus navigation remains at the root node 701. Accordingly, the affirming node 731 for the expression in parent table row 421A is encountered without reaching the nullifying node 734 for the expression in the parent table row 421A. Accordingly, the association 431 of FIG. 4 can be made.

Accordingly, the principles described herein may be performed to automatically associate foreign keys of child table rows in a database with parent table rows in the database. The navigation is made especially efficient through the use of a trie structure that allows for fast joining of foreign keys to parent rows in database systems. Furthermore, the associations may be easily updated. For instance, if a row in the parent table is added or changed, the descendant path of that parent row may be reevaluated and changed without reconstructing the entire trie structure. Furthermore, if a foreign key is changed or added in the child table, only that foreign key (and not the other foreign keys) is to be reevaluated using method 800. Thus, the mapping is resilient to changes in database entries, and can be updated on the fly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable storage media having thereon one or more computer-executable instructions that are structured such that, when executed by the one or more processors, cause the computing system to perform the following:
receive a data table that includes a plurality of rows, a particular row of the plurality of rows includes an expression comprising a predicate and an argument for said predicate such that both the predicate and the argument are included as parts of the data table within the particular row and such that, in order to form an association with the particular row, a foreign key from a different data table satisfies the predicate and argument combination forming the expression; and
in response to evaluating the expression, automatically augment a computer navigable trie structure, including performing the following:
evaluate the expression to identify the predicate that is included in the expression and the argument that is included in the expression;
augment the trie structure so that the predicate and the argument are included within at least one descendant path of the trie structure; and
associate the particular row with the descendant path such that the trie structure is navigable using the foreign key from the different data table to determine whether the particular row is mappable to the foreign key.

2. The computing system in accordance with claim 1, wherein the particular row comprises a plurality of predicates and a plurality of arguments, each predicate having a corresponding descendant path in the computer-navigable trie structure.

3. The computing system in accordance with claim 2, the plurality of predicates of the particular row including a first predicate comprising a contains predicate, wherein in response to evaluating the first predicate, the trie structure is augmented to include a descendent path associated with the contains predicate.

4. The computing system in accordance with claim 3, the plurality of predicates of the particular row including a second predicate comprising a does not contain predicate, wherein in response to evaluating the second predicate, the trie structure is augmented to include a descendent path associated with the does not contain predicate.

5. The computing system in accordance with claim 1, wherein the predicate comprises a between predicate.

6. The computing system in accordance with claim 1, wherein the predicate comprises a minimum predicate.

7. The computing system in accordance with claim 1, wherein the predicate comprises a maximum predicate.

8. A method, implemented at one or more processors of a computer system, for constructing a computer-navigable trie structure having a plurality of descendant paths, the method including:
receiving a parent table that includes a plurality of rows, a particular row of the plurality of rows includes an expression comprising a predicate and an argument for said predicate such that both the predicate and the argument are included as parts of the data table within the particular row and such that, in order to form an association with the particular row, a foreign key from a different data table satisfies the predicate and argument combination forming the expression; and
incrementally augmenting the trie structure in response to evaluating the expression, including performing the following:
evaluating the expression to identify the predicate that is included in the expression and the argument that is included in the expression;
augmenting the trie structure so that the predicate and the argument are included within a descendant path of the trie structure; and
associating the particular row with the descendant path such that the trie structure is navigable using the foreign key from the different data table to determine whether the particular row is mappable to the foreign key.

9. The method in accordance with claim 8, wherein the descendant path in the trie structure comprises a contains predicate, a does not contain predicate, an equals predicate, or a range predicate.

10. The method in accordance with claim 8, wherein associating the particular row with the descendant path includes formulating a leaf node of the descendant path and that includes a row identifier that identifies the particular row.

11. The method in accordance with claim 8, wherein associating the particular row with the descendant path includes indicating a number of descendant paths that correspond to a plurality of predicates that are to be met in order to map the foreign key to the particular row.

12. The method of claim 8, wherein associating the particular row with the descendant path includes formulating a leaf node of the descendant path and that includes a row identifier that identifies the particular row.

13. The method of claim 8, wherein associating the particular row with the descendant path includes indicating a number of descendant paths that correspond to a plurality of predicates that are to be met in order to map the foreign key to the particular row.

14. A computer program product comprising one or more computer-readable hardware storage devices having stored thereon computer-executable instructions structured such that, when executed by one or more processors of a computing system, cause the computing system to construct a computer-navigable trie structure having at least one descendent path by causing the computing system to at least:
receive a data table that includes at least one row, the at least one row including an expression comprising a predicate and an argument for said predicate such that both the predicate and the argument are included as parts of the data table within the at least one row and such that, in order to form an association with the at least one row, a foreign key from a different data table satisfies the predicate and argument combination forming the expression; and
in response to evaluating the expression, modify the trie structure, including at least:
evaluating the expression to identify the predicate that is included in the expression and the argument that is included in the expression;
augmenting the trie structure so that the predicate and the argument are included within at least one descendant path of the trie structure; and
associating the at least one row with the at least one descendant path of the tire structure, such that the trie structure is navigable using the foreign key from the different table to determine whether the at least one row is mappable to the foreign key.

15. The computer program product in accordance with claim 14, wherein associating the at least one row with the at least one descendant path comprises formulating a leaf node off the at least one descendant path that includes a row identifier that identifies the at least one row of the data table.

16. The computer program product in accordance with claim 14, wherein the predicate comprises a contains predicate.

17. The computer program product in accordance with claim 14, wherein the predicate comprises a does not contain predicate.

18. The computer program product in accordance with claim 14, wherein the predicate comprises a between predicate.

19. The computer program product in accordance with claim 14, wherein the predicate comprises a minimum predicate.

20. The computer program product in accordance with claim 14, wherein the predicate comprises a maximum predicate.

* * * * *